United States Patent
Peloquin et al.

(10) Patent No.: US 6,754,798 B1
(45) Date of Patent: Jun. 22, 2004

(54) METHOD AND AN APPARATUS FOR VOLUME CREATION IN THE PRESENCE OF MULTIPLE AGGREGATORS

(75) Inventors: Mark A. Peloquin, Austin, TX (US); Benedict Michael Rafanello, Round Rock, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/697,450

(22) Filed: Oct. 26, 2000

(51) Int. Cl.[7] ............................................. G06F 12/06
(52) U.S. Cl. ..................... 711/210; 711/112; 707/514; 707/100
(58) Field of Search ...................... 711/111, 112, 173, 711/209, 207, 170, 210; 707/200, 205, 10, 100, 514, 520

(56) References Cited

U.S. PATENT DOCUMENTS

| | | | | |
|---|---|---|---|---|
| 5,129,088 A | * | 7/1992 | Auslander et al. ............. | 711/1 |
| 5,842,214 A | * | 11/1998 | Whitney et al. ............... | 707/10 |
| 5,862,331 A | * | 1/1999 | Herriot ........................ | 709/219 |
| 5,903,913 A | * | 5/1999 | Ofer et al. .................... | 711/112 |
| 5,946,685 A | * | 8/1999 | Cramer et al. ................. | 707/10 |
| 6,061,743 A | * | 5/2000 | Thatcher et al. ............. | 707/100 |
| 6,256,031 B1 | * | 7/2001 | Meijer et al. ................ | 707/203 |
| 6,381,627 B1 | * | 4/2002 | Kwan et al. ................. | 709/201 |
| 6,401,183 B1 | * | 6/2002 | Rafizadeh .................... | 711/173 |
| 6,453,383 B1 | * | 9/2002 | Stoddard et al. ............. | 711/112 |
| 6,496,839 B2 | * | 12/2002 | Cabrera et al. ............. | 707/203 |
| 6,516,325 B1 | * | 2/2003 | Blanchard et al. ........ | 707/104.1 |
| 6,636,871 B1 | * | 10/2003 | Rafanello et al. ........... | 711/111 |
| 6,647,393 B1 | * | 11/2003 | Dietterich et al. .......... | 707/102 |
| 6,654,881 B2 | * | 11/2003 | Cabrera et al. ............. | 713/100 |
| 6,671,688 B1 | * | 12/2003 | Nikols et al. ................. | 707/10 |

\* cited by examiner

*Primary Examiner*—Pierre-Michel Bataille
(74) *Attorney, Agent, or Firm*—Duke W. Yee; David A. Mims, Jr.; Stephen J. Walder, Jr.

(57) ABSTRACT

A method and apparatus to dynamically order features and manage features, especially aggregators, during creation of a logical volume is provided. The method and apparatus make use of a partition/aggregate list to identify partitions and/or aggregates that make up a logical volume that is to be created. In addition, the partition/aggregate list identifies features to be applied to the partitions and/or aggregates as well as the order in which these features are to be applied. The order in which these features are to be applied is designated by a current feature indicator (CFI). Based on a current CFI count of an entry in the partition/aggregate list, application of a feature corresponding to the current CFI count is attempted. If successful, the current CFI count is incremented and the process returns to a first entry in the partition/aggregate list. If unsuccessful, the current CFI count is not incremented and the process continues on to the next entry in the partition/aggregate list.

32 Claims, 4 Drawing Sheets

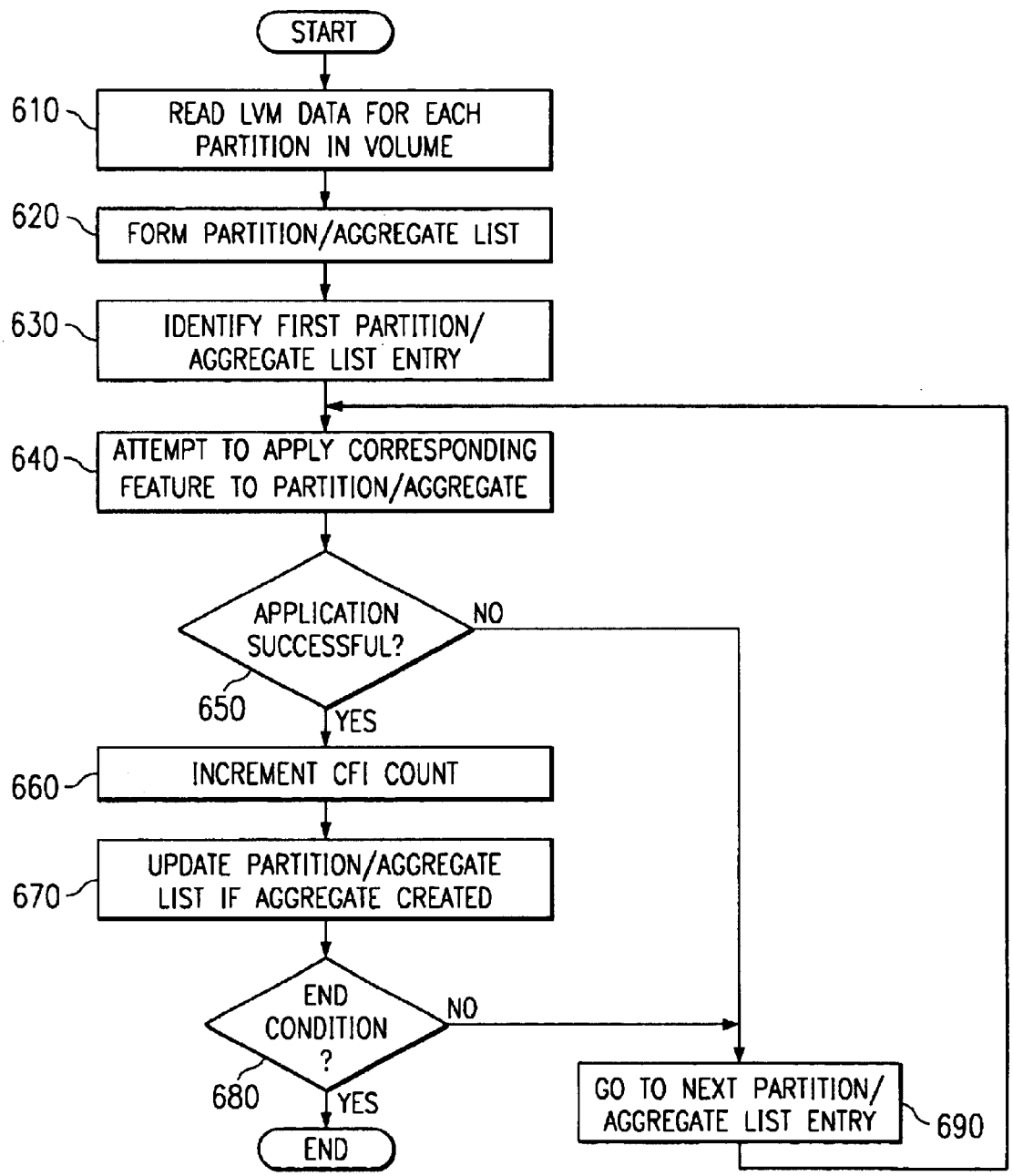

METHOD AND AN APPARATUS FOR VOLUME CREATION IN THE PRESENCE OF MULTIPLE AGGREGATORS

RELATED APPLICATIONS

The present application is related to commonly assigned and co-pending U.S. patent application Ser. No. 09/697,579 entitled "METHOD AND AN APPARATUS FOR DYNAMIC COMMAND LINE PARSING IN THE PRESENCE OF MULTIPLE PLUG-IN COMPONENTS" and Ser. No. 09/697,449 entitled "METHOD AND AN APPARATUS TO DYNAMICALLY ORDER FEATURES AND TO RESOLVE CONFLICTS IN A MULTIPLE-LAYER LOGICAL VOLUME MANAGEMENT ENVIRONMENT", filed on even date herewith, and hereby incorporated by reference.

BACKGROUND OF THE INVENTION

1. Technical Field

The present invention relates generally to an improved method to manage logical volumes and, in particular, to a method and an apparatus for volume creation in the presence of multiple aggregators.

2. Description of the Related Art

The Logical Volume Manager (LVM) is a subsystem for on-line disk storage management that adds an additional layer between the physical devices and the block I/O interface in the kernel of the operating system to allow a logical view on storage. For systems without a LVM, each of the partitions that is usable by the operating system is assigned a drive letter, such as "C:" or "F:", producing a correlating drive letter for each partition on a disk in the computer system. The process which assigns these letters is commonly known.

For systems with an LVM, a drive letter may be mapped instead to a logical volume which may contain one or more partitions. The process by which partitions are combined into a single entity is known generically as "aggregation." There are various forms of aggregation, such as Drive Linking and software Redundant Array of Independent Disks ("RAID"). Each feature, i.e. a function that may be performed on a partition, aggregate or volume, offered by the LVM is a layer in the LVM. The input to a layer has the same form and structure as the output from a layer. The layers being used on a volume form a stack, and I/O requests are processed from the top most layer down the stack to the bottom most layer. Typically, the bottom most layer is a special layer called the Pass Through layer.

U.S. patent application Ser. No. 09/561,184 now abandoned, which is hereby incorporated by reference, discloses a multi-layer logical volume management system for an LVM in the OS/2 operating system. Similar systems can be extended to handle multiple levels of aggregation in other operating systems.

Multiple levels of aggregation allows multiple aggregators, such as Drive Linking and software RAID, to be used together to bypass the limitations inherent in each individual aggregation technology. As an example, many software RAID implementations have a limit on the number of partitions that can be combined into a single entity. However, by using Drive Linking to combine several software RAID entities into a single volume, the volume can have the benefits of software RAID while employing more partitions than software RAID by itself would allow.

A multi-layer logical volume management system introduces complexity and new management issues, such as ordering of features and management of aggregators during creation of the logical volume. Therefore, it would be advantageous to have a method and an apparatus to create logical volumes in the presence of multiple aggregators.

SUMMARY OF THE INVENTION

The present invention provides a method and apparatus to dynamically order features and manage features, especially aggregators, during creation of a logical volume. The present invention makes use of a partition/aggregate list to identify partitions and/or aggregates that make up a logical volume that is to be created. In addition, each element in the partition/aggregate list identifies features to be applied to itself as well as the order in which these features are to be applied. The order in which these features are to be applied is designated by a current feature indicator (CFI). Based on a current CFI count of an entry in the partition/aggregate list, application of a feature corresponding to the current CFI count is attempted. If successful, the current CFI count is incremented and the process returns to a first entry in the partition/aggregate list. If unsuccessful, the current CFI count is not incremented and the process continues on to the next entry in the partition/aggregate list.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart outlining an exemplary operation of the present invention.

DETAILED DESCRIPTION OF THE PREFERRED EMBODIMENT

Figure 1:
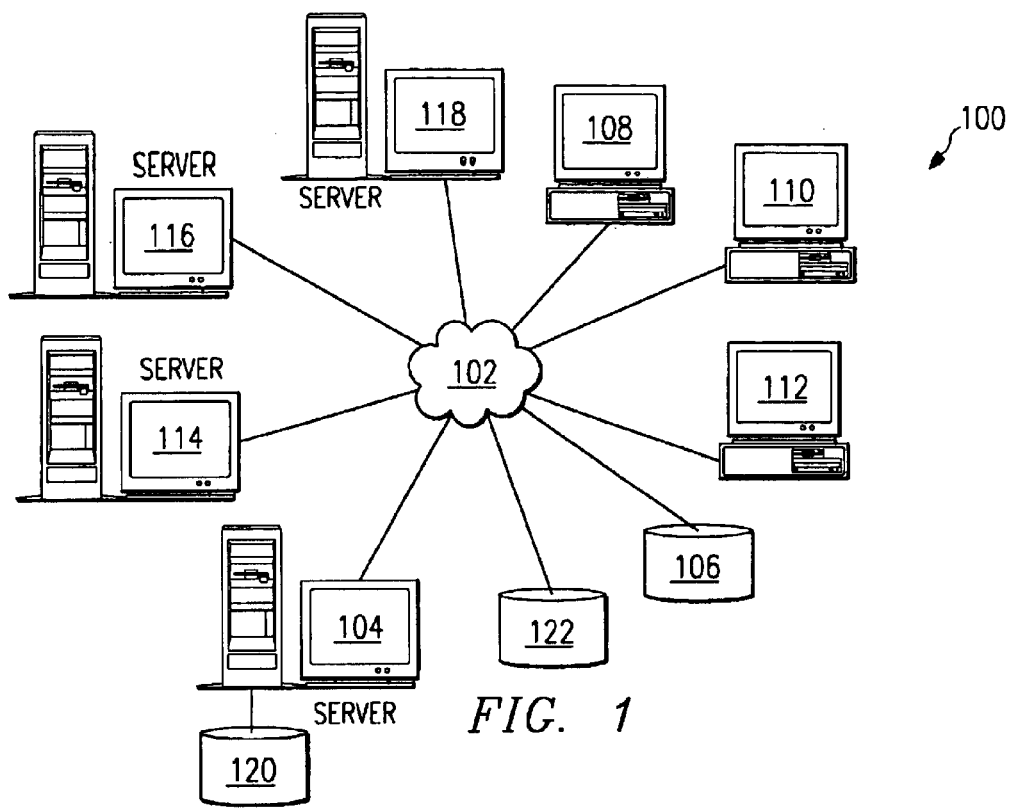
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network. FIG. 1 is intended as an example and not as an architectural limitation for the processes of the present invention.

Figure 2:
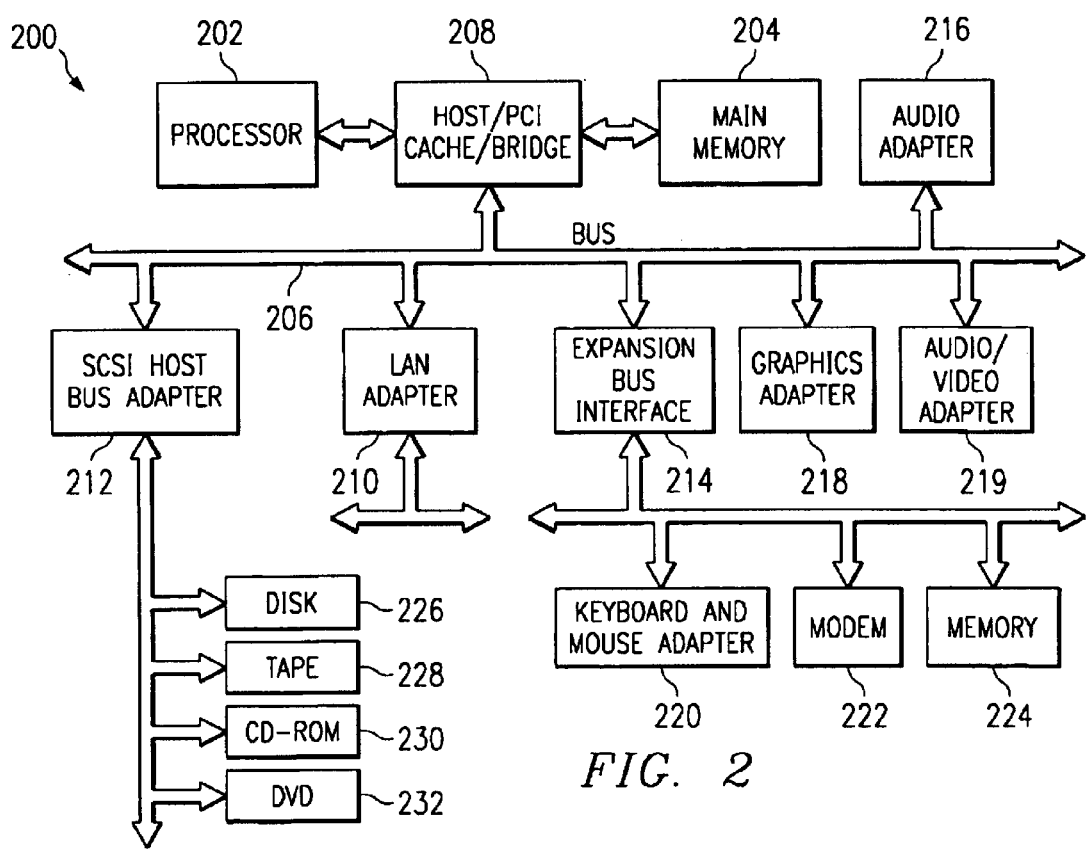
FIG. 2 is a block diagram of a data processing system that may be implemented as a server or a client in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used.

Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

The invention is preferably realized using a well-known computing platform, such as an IBM personal computer, running the IBM OS/2 operating system. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

The present invention provides a mechanism by which features of a logical volume manager (LVM) are dynamically ordered and management of features of the logical volume, especially aggregators, is performed in order to create the logical volume. The LVM may be implemented in a data processing device, such as data processing device 200 in FIG. 2, or the like, as hardware, software or a combination of hardware and software. In a preferred embodiment of the present invention, the LVM is implemented as software executed by processor 202.

A LVM is an application/apparatus that is used to create and manage logical volumes. LVMs are generally known in the art. The present invention provides a system by which a logical volume is created in accordance with the features that need to be applied to partitions/aggregates that comprise the logical volume. With the present invention, features are applied to partitions/aggregates based on an ordering of these features such that any prerequisites to the application of the features are automatically accommodated. In this way, the complexity of creating the logical volumes is reduced.

Features of a logical volume may be provided to the LVM in many different ways. The features may be hard-coded into the LVM, provided as part of software updates, and the like. In a preferred embodiment of the present invention, features are provided as plug-in components of the LVM. A plug-in component is an auxiliary hardware or software component that works with a major software package to enhance its capabilities. The use of plug-in components to modify the features offered by a LVM allows for updating and increasing the capabilities of the LVM.

The plug-in features are classified into one of three different layers:

1) Partition Level plug-in—A plug-in designed to operate on a partition within a volume;
2) Aggregate Level plug-in—A plug-in that is designed to combine multiple partitions into a single entity called an aggregate or to combine aggregates; and 3) Volume Level plug-in—A plug-in that is designed to operate on an entire volume. Thus, plug-in features provide a mechanism by which a multi-layer logical volume may be formed.

Figure 3:
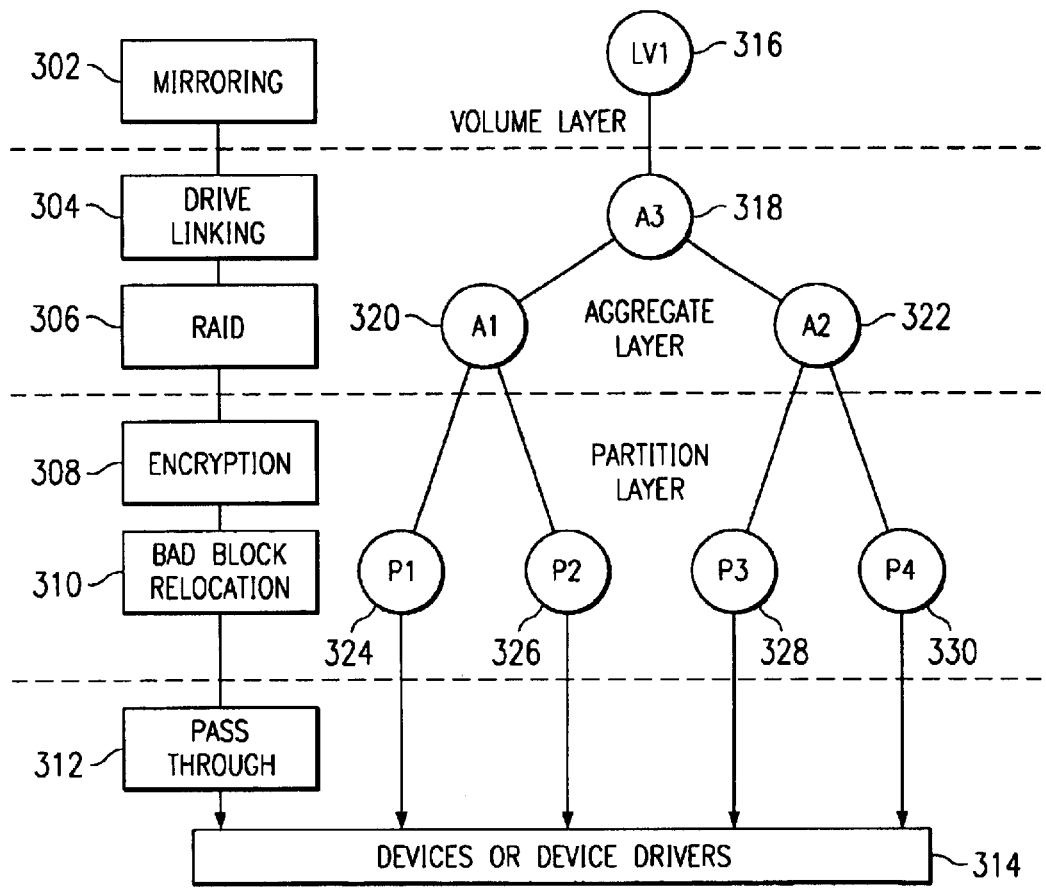
FIG. 3 depicts the relationship between a feature stack model and a tree model of a multi-layer LVM.

FIG. 3 shows, by way of example, the correlation between a "feature stack" model, i.e. a model of the features that are applied to partitions/aggregates at various layers, and a "tree" model of a multi-layer logical volume. The feature stack is a hierarchical stack of plug-in features ordered based on their classifications. The lowest level feature is a pass through feature. The next lowest level features are the partition level plug-ins, the middle level features are the aggregate level plug-ins, and the top level features are the volume level features.

On the left of FIG. 3, items 302–312, the "feature stack" is shown. While there is no particular limit on the number of features which may appear in the "feature stack", for simplicity, FIG. 3 employs only six features. In the particular "feature stack" shown in FIG. 3, a "Pass Through" feature 312 is at the bottom which interfaces to the disk devices or device drivers 314. Above the "Pass Through" feature 312 is the Bad Block Relocation ("BBR") feature 310. Above this feature is the Encryption feature 308. Above the Encryption feature is the software RAID 306 and Drive Linking 304 features. At the top of the feature stack is Remote Mirroring 302. From the view of the feature stack model, an I/O request is received at the top of the stack and propagated downwards to the "Pass Through" feature.

The corresponding tree model is shown to the right of the feature stack model. Logical volume LV1 316 is at the root of the tree. The child of LV1 is the aggregate A3 318, which is created by the Drive Linking feature. The Drive Linking feature creates A3 318 from aggregates A2 322 and A1 320, which appear in the tree model as the children of A3. Aggregates A1 320 and A2 322 are created by the Software RAID feature, and the partitions from which they are made of appear in the tree model as their children. Thus, the software RAID feature creates aggregate A1 320 from partitions P1 324 and P2 326, and creates aggregate A2 322 from partitions P3 328 and P4 330.

An aggregator can group either multiple partitions, as is the case for A1 and A2, or multiple aggregates, as is the case for A3, or any combinations of partitions and aggregators needed by the aggregating feature. Allowing multiple features in the feature stack to create aggregates can help overcome some system limitations. For example, many RAID systems limit the number of partitions that may be used in an aggregate. However by allowing disk linking of RAID aggregates, as shown in FIG. 3, this software limitation can effectively be overcome.

It should be noted that the tree model consists of nodes that represent views or mapping of physical storage. Nodes can be physical partitions or aggregators. Since aggregators combine one or more storage nodes into a single resulting node, the resulting node represents a different view or mapping of the original storage nodes. Thus, the tree model will only depict nodes for partitions and features which produce aggregates. Other features which appear in the feature stack model do not have corresponding nodes in the tree model because they operate on the data contained within the node, rather than the view or representation of the underlying storage.

Thus, Remote Mirroring 302, for example, affects the processing of an I/O request as the I/O request proceeds from LV1 316 to A3 318 in the tree model of the volume. Similarly, Encryption and BBR affect the processing of I/O requests as they proceed from A1 320 to P1 324 and P2 326, or A2 322 to P3 328 and P4 330. These types of LVM structures, feature stack models, and tree models are well understood in the art, and the models can be equally well applied to logical volume management systems in other operating systems such as Hewlett Packard's HP-UX and IBM's AIX.

The LVM of the present invention allows multiple aggregators to be present in the system. For example, as shown in FIG. 3, two aggregators, RAID 306 and Drive Linking 304, may be used to combine partitions and aggregates into other aggregates. Since the user can choose which features to use on a volume when the volume is being created, every volume in the system can have a different set of features being used on it as well as different levels of aggregation. This makes volume discovery, i.e. the process by which the LVM creates all of the volumes in the system after boot, difficult.

When performing the volume discovery process, the LVM examines all of the partitions in a system. Each partition which is part of an LVM volume has LVM data associated with it. The LVM data identifies which volume the partition belongs to and which LVM features are used on that partition. Once the LVM has determined which partitions are part of which volumes, the LVM groups them according to volume. At this point, the LVM knows how many volumes it is trying to create. The LVM then starts with the first potential volume and processes all of the partitions belonging to that volume until it determines whether or not it can successfully create the volume. The LVM then repeats this process until all of the potential volumes have either been created or discarded.

If multiple levels of aggregation are used on a volume, the processing of partitions for the volume may become extremely complicated. Each partition/aggregate has LVM data associated with it which indicates to the LVM which features (plug-ins) are to be applied to this partition/aggregate. However, if a partition is part of an aggregate, the partition's LVM data does not indicate what features are applied to the aggregate. This information is stored in the aggregate's LVM data and is not accessible until the aggregate is created.

Furthermore, an aggregator may combine aggregates and/or partitions in any combination. This means that when the LVM examines the LVM data associated with a partition, the data may indicate that the partition belongs to an aggregate but this aggregate may also contain other aggregates which must be created first. Moreover, each partition belonging to a specific aggregate may have different LVM features applied to it before it becomes a member of the aggregate. Thus, there are many combinations of features, partitions, and aggregates that may result. The present invention provides a mechanism for handling these multiple combinations when creating logical volumes as well as detecting bad or illegal combinations.

With the present invention, the LVM data stored for each partition indicates which features are to be applied to the partition and the order in which they must be applied. The LVM associates a current feature indicator (CFI) with each partition and/or aggregate. The CFI informs the LVM which feature is next to be applied to a given partition or aggregate. The CFI is initialized to the first feature that needs to be applied to the partition or aggregate it is associated with.

The partitions for a given volume are compiled into a partition/aggregate list. This partition/aggregate list initially contains only partitions, but as the volume creation process continues, the list may also contain aggregates. The LVM begins with the first element in the list. Control is passed to the discovery code of the feature indicated by this element's CFI.

When the discovery code for the feature is called, the LVM passes the list of partitions/aggregates for the volume as well as an indication of which element in the list the feature should use to begin its discovery process. If the feature can initialize itself on that element, it returns success to the LVM and increments the CFI count for that element.

In the case of an aggregator, the LVM may need to examine other elements in the list to see if all of the partitions/aggregates it needs to build that aggregate are present. If the feature cannot find all of the required pieces of the aggregate, it returns an incomplete error message to the LVM. If successful, the feature increments the CFI count for all elements and returns success to the LVM.

It should be noted that all of the pieces of the aggregate may be found but only those pieces whose CFI indicates the aggregating feature will be able to be aggregated. This prevents a partition from becoming part of an aggregate until all of the prerequisite features that need to be applied have been so applied.

If the aggregate feature can create the aggregate as determined by the discovery code, the aggregate feature forms the aggregate, removes the elements of the aggregate from the partition/aggregate list, and places an entry in the partition/aggregate list for the aggregate. The LVM data for the aggregate is then read in from the end of the aggregate, such as in a distributed system, or from a database, such as in a non-distributed system. and made available to the LVM which then associates a CFI with the aggregate and initializes the CFI to the first feature that needs to be applied to the aggregate. For any feature returning without success, the CFI count(s) are left unchanged.

When the feature finishes its discovery process, control is returned to the LVM. The LVM then examines the return code from the feature to determine if the application of the feature was successful or incomplete. If successful, the LVM continues at the first element in the list to be able to evaluate any changes to the list caused by an aggregating feature. If the application of the feature was incomplete, then the LVM proceeds to the next element in the list.

If the last element in the partition/aggregate list is reached and it returns incomplete, a fatal error has occurred. This may occur, for example, when elements of the logical volume are missing, thereby preventing the volume from being reconstructed. If there is only one element remaining in the list and the CFI for that element indicates the end of the feature list, then the volume has been successfully reconstructed.

Figure 4:
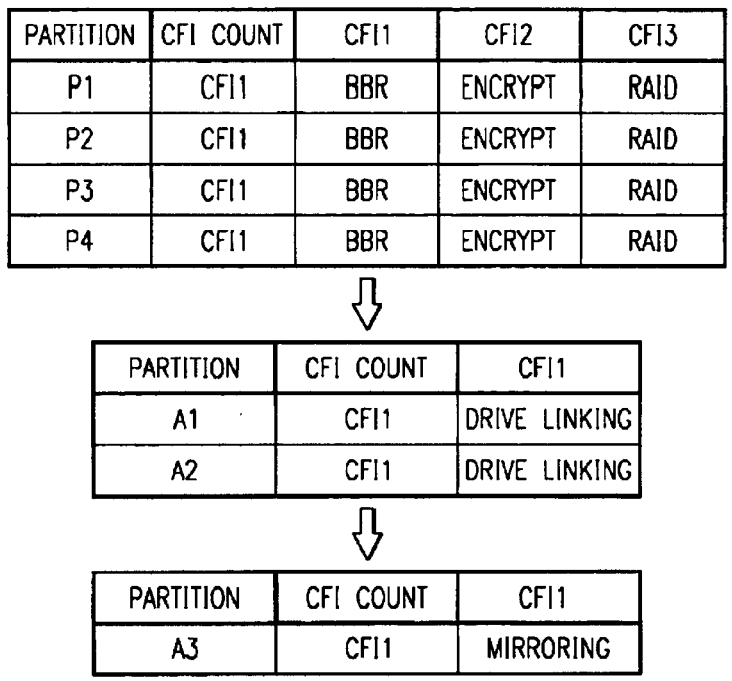
FIG. 4 is an exemplary diagram illustrating a partition/aggregate list data structure and the use of the partition/aggregate list data structure in accordance with the present invention.

FIG. 4 is an exemplary diagram illustrating the partition/aggregate list data structure and the use of the partition/aggregate list in accordance with the present invention. The particular partition/aggregate list data structure shown in FIG. 4 corresponds to the feature stack shown in FIG. 3. The partition/aggregate list data structure of FIG. 4 is for illustrative purposes only and is not meant to imply any limitations on the information contained in the partition/aggregate list, or the arrangement of the partition/aggregate list data structure. Other information may be included in the partition/aggregate list in addition to, or in replacement of, the information shown in FIG. 4 without departing from the spirit and scope of the present invention.

As shown in FIG. 4, the partition/aggregate list includes an entry for each partition/aggregate of the volume. Each entry contains one or more feature indicators of features that are to be applied to the partition/aggregate as well as the order in which these features are to be applied. The order of the features is designated in the feature array by the CFI associated with the feature.

When forming the logical volume, features are applied in accordance with their order designated by the incremental use of the CFI. Initially, the discovery code looks at the partition/aggregate list and identifies the first element in the partition/aggregate list. In the example shown in FIG. 4, this would be partition P1.

Partition P1 has a current CFI count of CFI1. Therefore, the feature associated with CFI1, i.e. bad block relocation (BBR), of the partition is applied to partition P1. If the application of the feature is successful, the CFI count will be incremented to CFI2 and the discovery process would return to the first element in the partition/aggregate list. If the application of the feature is not successful, the discovery code continues to the next entry in the partition/aggregate list and does not increment the CFI count for partition P1.

In the particular example shown in FIG. 4, the discovery operation, with respect to partitions P1 and P2 to form the aggregate A1, will function as follows:

1) Bad Block Relocation is attempted on partition P1—successful: operation increments CFI count for partition P1 to CFI2 and returns to entry for partition P1 (because it is the first entry in the partition/aggregate list);
2) Encryption is attempted on partition P1—successful: operation increments CFI count for partition P1 to CFI3 and returns to entry for partition P1;
3) RAID is attempted on partition P1—incomplete: CFI count for partition P1 remains at CFI3 and operation goes to entry for partition P2;
4) Bad Block Relocation is attempted on partition P2—successful: operation increments CFI count for partition P2 to CFI2 and returns to entry for partition P1;
5) RAID is attempted on partition P1—incomplete: CFI count for partition P1 remains at CFI3 and operation goes to entry for partition P2;
6) Encryption is attempted on partition P2—successful: operation increments CFI count for partition P2 to CFI3 and returns to entry for partition P1; and
7) RAID is attempted on partition P1—successful: CFI count for partitions P1 and P2 are incremented to CFI4 and operation replaces entries for partitions P1 and P2 with an entry for the aggregate A1 and initializes aggregate A1.

A similar process is performed on partitions P3 and P4 to form the aggregate A2 and on aggregates A1 and A2 to form the aggregate A3. Thus, with the present invention, the discovery process moves down the partition/aggregate list only when an attempt to apply a feature results in a failure.

While the particular example shown in FIG. 4 has all of the partitions having the same features and the same ordering of features applied to them, the invention is not limited to such a case. Rather, there may be some partitions that do not have the BBR feature applied to them, or the Encryption feature, or the like. There may be occasions when each partition has a different set of features applied and/or a different ordering of features.

In the above example, when the RAID feature is applied to partition P1, the discovery code determines that partitions P1 and P2 are to be aggregated by the RAID feature. Such a determination is made based on the LVM data of the partitions. For example, the LVM data may contain a unique aggregate identifier, such as a serial number. The partitions P1 & P2 may contain an identifier for the aggregate A1, and partitions P3 & P4 may contain an identifier for the aggregate A2, for example. The feature discovery code looks at the aggregate identifier of the element passed into it, then searches the remainder of the partition/aggregate list for entries having a current CFI count pointing to the aggregation feature and whose aggregate identifier matches that of the passed in element. The feature discovery code then aggregates these partitions/aggregates together. For example, if partition P1 was passed in, partition P2 would be found to match, and partitions P3 & P4 would be ignored since their aggregate identifiers do not match.

Thus, when partition P1 is passed in, the discovery code searches the partition/aggregate list for an entry having a current CFI count that points to an same aggregation feature. The discovery code then determines if the same aggregate identifier is present in partition P1 as in the discovered entries. If so, the RAID feature may be applied to both partitions/aggregates. The entries for the partitions/aggregates in the partition/aggregate list are then replaced by an entry for the aggregate A1, as shown in FIG. 4. The CFI count for the aggregate A1 is initialized to CFI1 and corresponding feature information is included in the partition/aggregate list for the aggregate, as obtained from the LVM data. The same process is performed for partitions P3 and P4 which are aggregated into aggregate A2.

When processing of aggregate A1 continues, CFI1 for aggregate A1 points to drive linking which is an aggregator feature. The discovery code looks for an entry having a current CFI count that points to a drive linking feature. If an entry is found, a determination is made as to whether the entry has the same aggregate identifier for the resulting aggregate, A2, as does aggregate A1. If so, the aggregates A1 and A2 are aggregated using drive linking and their entries in the partition/aggregate list are replaced with an entry for the resulting aggregate A3.

Aggregate A3 has a mirroring feature associated with it which is applied to the aggregate A3 in the same manner as described above. Thus, the volume is created in the presence of multiple aggregators.

Figure 5:
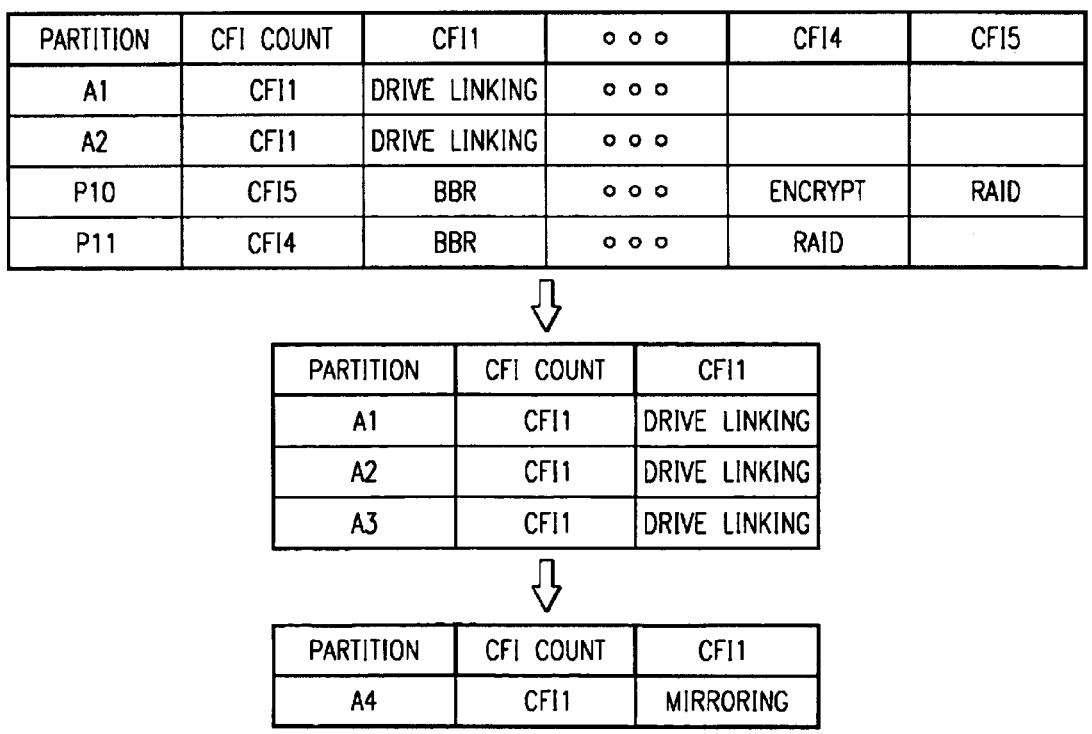
FIG. 5 is an exemplary diagram illustrating an example use of the partition/aggregate list data structure when a feature cannot be immediately applied to an aggregate.

FIG. 5 provides another example use of the partition/aggregate list data structure shown in FIG. 4. The example in FIG. 5 is provided to illustrate the potential inability to apply a feature at the first time the CFI for that feature is encountered.

The example in FIG. 5 assumes that partitions have been aggregated to form aggregates A1 and A2. In accordance with the present invention, these partitions have had their entries in the partition/aggregate list replaced with entries for the resulting aggregates A1 and A2. Aggregates A1 and A2 have only a single feature to applied to them which is drive linking. Their respective CFI counts have been initialized to CFI1. It is assumed that the drive linking of aggregates A1 and A2 requires that aggregates A1, A2 and A3 be aggregated via the drive linking feature.

When attempting to apply drive linking to aggregate A1, the discovery code will search the partition/aggregate list for entries having a current CFI count pointing to drive linking and having a same aggregate identifier. In addition, the LVM data for the aggregate A1 will inform the feature discovery code that three elements are expected to be aggregated using the feature.

In the particular example shown, an entry for A2 exists and the current CFI count for A2 does point to drive linking. However, an entry for aggregate A3 does not exist. As a result, the drive linking feature of aggregate A1 cannot be completed since only two elements of the resulting aggregate are present. Thus, the discovery code continues on to the next entry in the partition/aggregate list. The CFI count for aggregate A1 is not incremented and remains at CFI1.

This same process is repeated for aggregate A2. Eventually, the discovery code will attempt to apply the CFI5 feature of partition P10, i.e. the RAID aggregate feature. As a result, the RAID feature is applied to partitions P10 and P11 to form aggregate A3.

The partition list entries for P10 and P11 are then replaced by an entry for the aggregate A3. The discover process then returns to the first entry in the partition/aggregate list, the entry for A1, and the determination with regard to aggregates A2 and A3 will again be performed this time resulting in a positive outcome since aggregate A3 has now been formed. As a result, the aggregate A4, which is an aggregation of aggregates A1, A2 and A3, will be formed and the partition/aggregate list entries for A1, A2 and A3 will be replaced with an entry for aggregate A4.

This process is continually repeated until one of two stop conditions occurs. If all of the features of the various partitions and aggregates are successfully applied, the result will be a partition/aggregate list that contains a single entry to the volume with a CFI count pointing to a null feature entry. In this case, all partitions have been processed and the volume is successfully created.

If however, all of the features are not able to be applied to the partitions and/or aggregates, the end of the partition/aggregate list will be encountered with a last entry in the partition/aggregate list returning an incomplete result. In such an instance, an error message may be returned to the user indicating that there was a problem with the creation of the volume.

In the above embodiment, processing of partitions/aggregates in the partition/aggregate list proceeds only when an incomplete result is returned from an attempted application of a feature. However, the present invention may be implemented in many different ways without departing from the spirit and scope of the present invention.

For example, in another exemplary embodiment, processing of entries in the partition/aggregate list may be based on a lowest current CFI count. In such an embodiment, a search of the partition/aggregate list for an entry having a lowest current CFI count is performed. Application of the feature associated with the current CFI count is then attempted. If the application of the feature is successful, the current CFI count for that entry is incremented and the search for the lowest current CFI count is performed again. If the application of the feature is unsuccessful, the current CFI count for that entry is not incremented and the search for the lowest current CFI count is performed on the remaining entries in the partition/aggregate list.

As a further optimization, rather than searching the partition/aggregate list for a lowest current CFI count, the partition/aggregate list may be sorted based on various criteria. For example, the partition/aggregate list may be sorted such that the entries having a lowest current CFI count are ordered to be first in the partition/aggregate list.

As an alternative embodiment, partitions may be processed by incrementing their CFI count, attempting to apply a corresponding feature to the partition, and moving on to the next partition having a lowest CFI count only when a feature returns an incomplete message indicating the feature could not be applied to the partition. In this embodiment, the discovery process does not return to the first entry in the partition/aggregate list when a feature is successfully applied.

Thus, for example features corresponding to CFI1 and CFI2 may be applied to partition P1 in FIG. 4 with the CFI count being incremented from CFI1 to CFI2. Once the RAID feature of CFI3 is attempted on partition P1, an incomplete result will be returned and the discovery code will continue on to partition P2 without incrementing the CFI count for partition P1 again. The same process will be performed on partition P2. When the RAID feature of partition P2 is applied, it will be applied successfully since the CFI counter for partition P1 also points to the RAID feature and both partition P1 and P2 have the same aggregate identifier. The same process then continues for partitions P3 and P4. Once an end of the partition/aggregate list is encountered, the operation may continue from the first entry of the partition/aggregate list should more processing be necessary.

Furthermore, while the above embodiments are described in terms of the feature discovery code incrementing the current CFI count for a partition/aggregate list entry, the invention is not limited to such an embodiment. Rather, the LVM may be provided with a mechanism for incrementing the current CFI count for a partition/aggregate list entry based on, for example, an indication of successful application of a feature being returned from the feature discovery code. Other mechanisms for incrementing the current CFI count of a partition/aggregate list entry may be used without departing from the spirit and scope of the present invention.

As described above, with the present invention, logical volumes of physical storage device partitions may be created even in view of multiple aggregator features being applied to the partitions. The present invention provides a mechanism by which the prerequisites of aggregators are accommodated and features applied to the partitions of a logical volume are ordered for proper application to create the logical volume.

The present invention may be used when first creating a logical volume or when recreating a logical volume. For example, the present invention may be used upon reboot of a system in order to recreate logical volumes such that data stored to the logical volume may be retrieved properly. Once the logical volume is properly recreated, input/output operations may be conducted with the logical volume.

FIG. 6 is a flowchart outlining an exemplary operation of the present invention. As shown in FIG. 6, the operation starts with reading the LVM data for each partition in the volume (step 610). Thereafter, the partition list data structure is formed (step 620). The first partition list entry is identified (step 630) and a feature corresponding to the entry's current CFI count is attempted to be applied to the partition/aggregate (step 640).

A determination is made as to whether or not the application of the feature could be successfully completed (step 650). If so, the CFI count for the partition/aggregate is incremented (step 660). If the feature was an aggregator, the partition/aggregate list is updated by removing the members of the aggregate and adding the aggregate that was created (step 670). A determination is then made as to whether an end condition is present (step 680). As noted above, this may be the condition that only one entry in the partition list is present with a CFI pointing to null feature or the indication that the volume could not be created.

If an end condition is not present, or if the application of the feature was not successful in step 650, the operation continues to step 690 where the next partition list entry is selected. The operation then returns to step 640 and repeats steps 640–690 until an end condition is present at which time the operation ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. An apparatus for creating a logical volume, comprising:
means for generating a partition/aggregate list;
means for providing a current feature indicator for each feature of each entry in the partition/aggregate list; and
means for applying features to partition/aggregate list entries in accordance with the current feature indicators, wherein the means for applying features to partition/aggregate list entries in accordance with the current feature indicators includes means for applying features to partition/aggregate list entries based on a lowest current feature indicator count of all of the entries in the partition/aggregate list.

2. An apparatus for creating a logical volume, comprising:
means for generating a partition/aggregate list;
means for providing a current feature indicator for each feature of each entry in the partition/aggregate list; and
mean for applying features to partition/aggregate list entries in accordance with the current feature indicators, wherein the means for applying features to partition/aggregate list entries in accordance with the current feature indicators includes means for applying all of the features for an entry in a partition/aggregate list entry until an incomplete results is returned and then moving on to a next entry in the partition/aggregate list.

3. An apparatus for creating a logical volume, comprising:
means for generating a partition/aggregate list;
means for providing a current feature indicator for each feature of each entry in the partition/aggregate list, and
means for applying features to partition/aggregate list entries in accordance with the current feature indicators, wherein the means for applying features to partition/aggregate list entries includes:
means for identifying a current feature indicator count for an entry in the partition/aggregate list;
means for attempting to apply a feature, having a current feature indicator corresponding to the current feature indicator count, to the entry; and
means for incrementing the current feature indicator count for the entry if the attempt to apply the feature is successful.

4. The apparatus of claim 3, wherein the means for generating a partition/aggregate list includes:
means for identifying partitions that are part of the logical volume; and
means for generating an entry in the partition/aggregate list for each partition that is part of the logical volume based on logical volume data associated with the partition, wherein each entry contains one or more feature identifiers to be applied to the partition.

5. The apparatus of claim 3, further comprising:
means for identifying a current feature indicator count for a next entry in the partition/aggregate list if the attempt to apply the feature is not successful; and
means for attempting to apply a feature, having a current feature indicator corresponding to the current feature indicator count of the next entry in the partition/aggregate list.

6. The apparatus of claim 3, wherein the current feature indicator count is not incremented if the attempt to apply the feature is not successful.

7. The apparatus of claim 3, further comprising:
means for replacing entries in the partition/aggregate list if the attempt to apply the feature is successful and the feature is an aggregator.

8. The apparatus of claim 3, further comprising:
means for returning to a first entry in the partition/aggregate list if the attempt to apply the feature is successful, wherein the means for identifying, means for attempting, means for incrementing and means for returning repeatedly operate until a stop condition occurs.

9. The apparatus of claim 8, wherein if the attempt to apply the feature is not successful, the current feature indicator count for the entry is not incremented and the means for identifying, means for attempting, means for incrementing, and means for returning operate on a next entry in the partition/aggregate list.

10. The apparatus of claim 8, wherein the stop condition is one of all of the features for all of the entries in the partition/aggregate list being applied successfully, and a last entry in the partition/aggregate list returning a failure when attempting to apply a feature.

11. The apparatus of claim 3, wherein the apparatus includes a logical volume manager.

12. A method, in a data processing system, for creating a logical volume, comprising:
generating a partition/aggregate list;
providing a current feature indicator for each feature of each entry in the partition/aggregate list; and
applying features to partition/aggregate list entries in accordance with the current feature indicators, wherein applying features to partition/aggregate list entries in accordance with the current feature indicators includes applying features to partition/aggregate list entries based on a lowest current feature indicator count of all of the entries in the partition/aggregate list.

13. A method, in a data processing system, for creating a logical volume, comprising:
generating a partition/aggregate list;
providing a current feature indicator for each feature of each entry in the partition/aggregate list; and
applying features to partition/aggergate list entries in accordance with the current feature indicators, wherein applying features to partition/aggregate list entries in accordance with the current feature indicators includes applying all of the features for an entry in a partition/aggregate list entry until an incomplete result is returned and then moving on to a next entry in the partition/aggregate list.

14. A method, in a data processing systems, for creating a logical volume, comprising:
generating a partition/aggregate list;
providing a current feature indicator for each feature of each entry in the partition/aggregate list; and
applying features to partition/aggregate list entries in accordance with the current feature indicators, wherein generating a partition/aggregate list includes:
identifying partitions that are part of the logical volume, and
generating an entry in the partition/aggregate list for each partition that is part of the logical volume based on logical volume data associated with the partition, wherein each entry contains one or more feature identifiers to be applied to the partition; and
wherein applying features to partition/aggregate list entries includes:
identifying a current feature indicator count for an entry in the partition/aggregate list;
attempting to apply a feature, having a current feature indicator corresponding to the current feature indicator count, to the entry; and
incrementing the current feature indicator count for the entry if the attempt to apply the feature is successful.

15. The method of claim 14, further comprising:
identifying a current feature indicator count for a next entry in the partition/aggregate list if the attempt to apply the feature is not successful; and
attempting to apply a feature, having a current feature indicator corresponding to the current feature indicator count of the next entry in the partition/aggregate list.

16. The method of claim 14, wherein the current feature indicator count is not incremented if the attempt to apply the feature is not successful.

17. The method of claim 14, further comprising:
replacing entries in the partition/aggregate list if the attempt to apply the feature is successful and the feature is an aggregator.

18. The method of claim 14, further comprising:
returning to a first entry in the partition/aggregate list if the attempt to apply the feature is successful; and
performing the steps of identifying, attempting, incrementing and returning repeatedly until a stop condition occurs.

19. The method of claim 18, wherein if the attempt to apply the feature is not successful, the current feature indicator count for the entry is not incremented and the steps of identifying, attempting, incrementing, and returning are performed for a next entry in the partition/aggregate list.

20. The method of claim 18, wherein the stop condition is one of all of the features for all of the entries in the partition/aggregate list being applied successfully, and a last entry in the partition/aggregate list returning a failure when attempting to apply a feature.

21. The method of claim 14, wherein the method is implemented in a logical volume manager on the data processing system.

22. A computer program product in a computer readable medium for creating a logical volume, comprising:
first instructions for generating a partition/aggregate list;
second instructions for providing a current feature indicator for each feature of each entry in the partition/aggregate list; and
third instructions for applying features to partition/aggregate list entries in accordance with the current feature indicators, wherein applying features to partition/aggregate list entries includes:

fourth instructions for identifying a current feature indicator count for an entry in the partition/aggregate list;

fifth instructions for attempting to apply a feature, having a current feature indicator corresponding to the current feature indicator count, to the entry; and sixth instructions for incrementing the current feature indicator count for the entry if the attempt to apply the feature is successful.

23. The computer program product of claim 22, wherein generating a partition/aggregate list includes:

fourth instructions for identifying partitions that are part of the logical volume; and fifth instructions for generating an entry in the partition/aggregate list for each partition that is part of the logical volume based on logical volume data associated with the partition, wherein each entry contains one or more feature identifiers to be applied to the partition.

24. The computer program product of claim 22, wherein the third instructions for applying features to partition/aggregate list entries in accordance with the current feature indicators includes instructions for applying features to partition/aggregate list entries based on a lowest current feature indicator count of all of the entries in the partition/aggregate list.

25. The computer program product of claim 22, wherein the third instructions for applying features to partition/aggregate list entries in accordance with the current feature indicators includes instructions for applying all of the features for an entry in a partition/aggregate list entry until an incomplete result is returned and then moving on to a next entry in the partition/aggregate list.

26. The computer program product of claim 22, further comprising:

seventh instructions for identifying a current feature indicator count for a next entry in the partition/aggregate list if the attempt to apply the feature is not successful; and eighth instructions for attempting to apply a feature, having a current feature indicator corresponding to the current feature indicator count of the next entry in the partition/aggregate list.

27. The computer program product of claim 22, wherein the current feature indicator count is not incremented if the attempt to apply the feature is not successful.

28. The computer program product of claim 22, further comprising:

seventh instructions for replacing entries in the partition/aggregate list if the attempt to apply the feature is successful and the feature is an aggregator.

29. The computer program product of claim 22, further comprising:

seventh instructions for returning to a first entry in the partition/aggregate list if the attempt to apply the feature is successful; and eighth instructions for executing the first, second, third and fourth instructions repeatedly until a stop condition occurs.

30. The computer program product of claim 29, wherein if the attempt to apply the feature is not successful, the current feature indicator count for the entry is not incremented and the first, second, third and fourth instructions are executed for a next entry in the partition/aggregate list.

31. The computer program product of claim 22, wherein the computer program product is executed in a logical volume manager on a data processing system.

32. The computer program product of claim 29, wherein the stop condition is one of all of the features for all of the entries in the partition/aggregate list being applied successfully, and a last entry in the partition/aggregate list returning a failure when attempting to apply a feature.

* * * * *

UNITED STATES PATENT AND TRADEMARK OFFICE
CERTIFICATE OF CORRECTION

PATENT NO.        : 6,754,798 B1
APPLICATION NO. : 09/697450
DATED             : June 22, 2004
INVENTOR(S)       : Peloquin et al.

It is certified that error appears in the above-identified patent and that said Letters Patent is hereby corrected as shown below:

Col. 7, line 27: after "in a", delete "non-distributed system." and insert -- distributed system, --
Col. 1, lines 38-39: after "generically as", delete " "aggregration -." " and insert --"aggregation." -- and return.
Col. 12, line 48: after "incomplete", delete "results" and insert -- result -- .

Signed and Sealed this

Eighth Day of August, 2006

JON W. DUDAS
*Director of the United States Patent and Trademark Office*